United States Patent [19]

Fisher

[11] Patent Number: 5,042,592

[45] Date of Patent: Aug. 27, 1991

[54] POWER TOOL

[76] Inventor: Hugh E. Fisher, Dunree Farm, Dalrymple, Ayrshire, KA6 6BA, Scotland

[21] Appl. No.: 507,609

[22] Filed: Apr. 10, 1990

[51] Int. Cl.[5] .......................... A01B 33/04; B26B 9/00

[52] U.S. Cl. .................................... 173/109; 30/272.1

[58] Field of Search ...................... 30/292.1, 182, 187, 30/188, 204, 205, 208, 209, 237, 241; 310/12; 173/109, 114, 117, 123

[56] References Cited

U.S. PATENT DOCUMENTS

| | | | |
|---|---|---|---|
| 2,535,253 | 12/1950 | Anderson | 30/272.1 |
| 3,049,803 | 8/1962 | Danger | 30/272.1 |
| 3,832,776 | 9/1974 | Sawyer | 30/272.1 |
| 4,669,190 | 6/1987 | Innami et al. | 30/272 R |
| 4,785,210 | 11/1988 | Maruyama et al. | 310/12 |
| 4,884,344 | 12/1989 | Martinez et al. | 30/273 |

FOREIGN PATENT DOCUMENTS

| | | | |
|---|---|---|---|
| 2481184 | 10/1981 | France | 30/272.1 |

*Primary Examiner*—Douglas D. Watts
*Assistant Examiner*—Paul M. Heyrana, Sr.
*Attorney, Agent, or Firm*—Kareem M. Irfan

[57] ABSTRACT

The invention provides a portable power tool which is lightweight and convenient to use by the general public in any of its various forms, as a wallpaper stripper, a paint scraper or a cold chisel up to a power spade. The tool comprises a housing (12), a drive means, conveniently an electric motor (14,160) adapted to drive a selected tool bit (4,56,62,64,66,68), the output shaft (44) moving in a reciprocating axial movement. Conveniently the drive means may be a linear motor (160) or if used with a cam device, a rotary motor (14). The cam device may be a cylinder cam (32) provided with a sinusoidal cam track (34).

11 Claims, 8 Drawing Sheets

POWER TOOL

The invention is concerned with power tools, particularly, but not exclusively relatively lightweight power tools suitable for use by the general public.

A number of power tools are in general use in the handyman's do-it-yourself market, for example, power drills, saws and the like. However, those jobs involving breaking up hard materials such as concrete, slabs, stone or even heavy earth have not readily been tackled by anything less than a heavy duty or industrial tool as for example, a pneumatic drill.

The present invention further provides a portable power tool comprising a housing, a drive means and a mounting arrangement for a selected one of a plurality of interchangeable tool bits, wherein there is provided within the housing an output arrangement adapted to drive an output shaft in a reciprocal axial movement to drive a selected tool bit.

Advantageously the drive means may be a linear output motor. Alternatively, the drive means may be a rotary motor requiring the intermediary of a device, which may be a cam device, to convert rotary motion into axially reciprocating motion.

Conveniently, therefore, there may be provided a cylinder cam mounted for rotation with the output shaft from the motor, said cam being provided with a sinusoidal cam track extending around its circumferential surface, an output shaft adapted to partake of reciprocal axial movement to drive a selected tool bit, and cam follower means adapted to run in said cam track to impart said reciprocal axial motion to said output shaft.

Conveniently, the cylinder cam may be selected from a plurality of cam members having a range of cam throw distances.

Where necessary, intermediate gearing may be interposed between the motor and the output shaft. Conveniently, the motor may be powered by mains electricity using a transformer, or by batteries. If desired, the batteries may be of the re-chargeable type or may be replaceable. In an example of the invention, the batteries may be incorporated into a detachable battery/handle module for rapid replacement. In another example mains power is provided by a detachable cable and a battery pack is provided for use in place of mains power when the cable is detached. Conveniently the batteries may be of the rechargeable type.

There will now be described several examples of devices according to the invention. It will be understood that the descriptions are given by way of example only and not by way of limitation.

Figure 2:
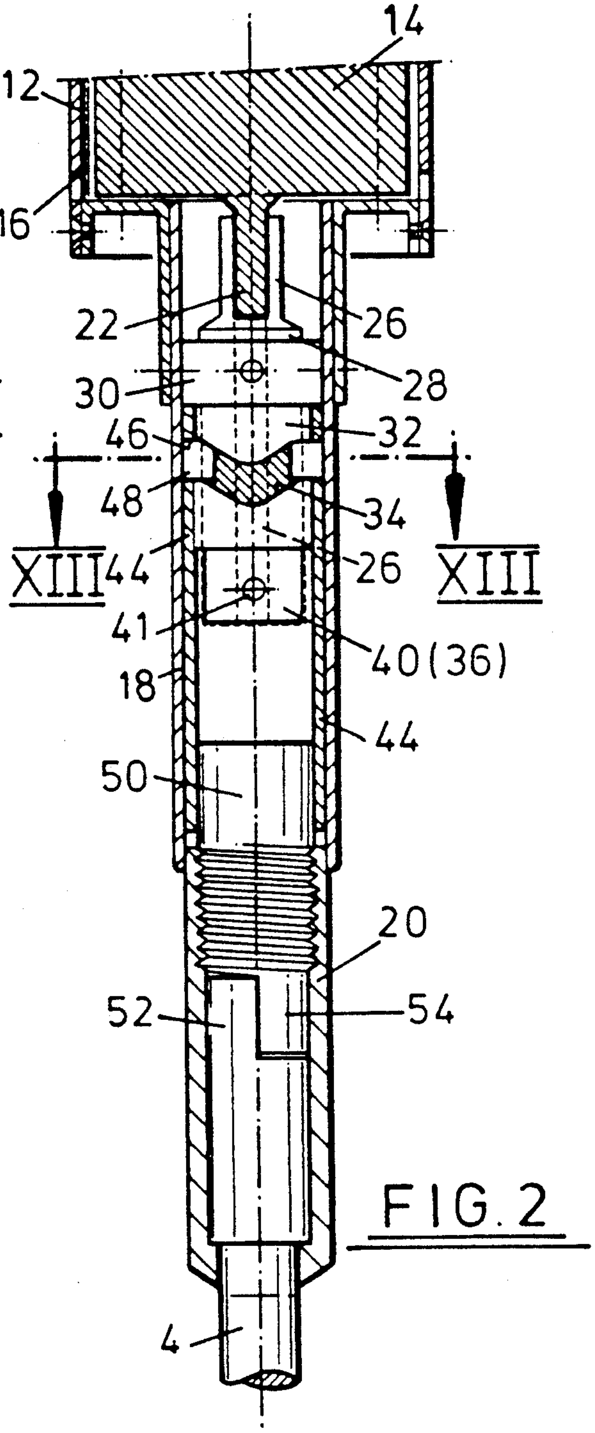
FIG. 2 is a longitudinal section through an intermediate portion of the tool of FIG. 1, to an enlarged scale.
Figure 3:
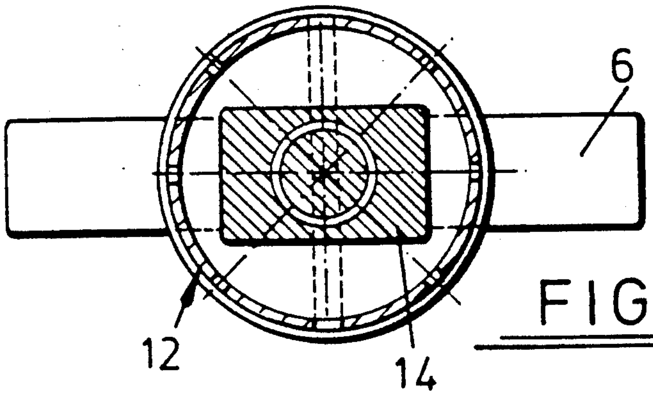
FIG. 3 is a section on line III—III of FIG. 1, excluding power cable mounting point.
Figure 12A:
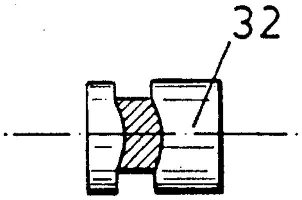
Figure 12B:
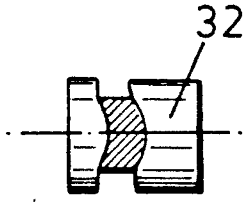
Figure 12C:
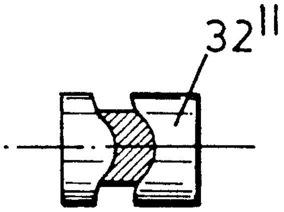
Figure 13:
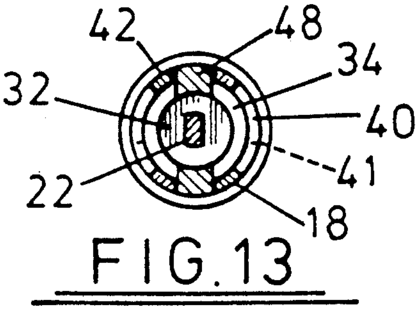
Figure 14:
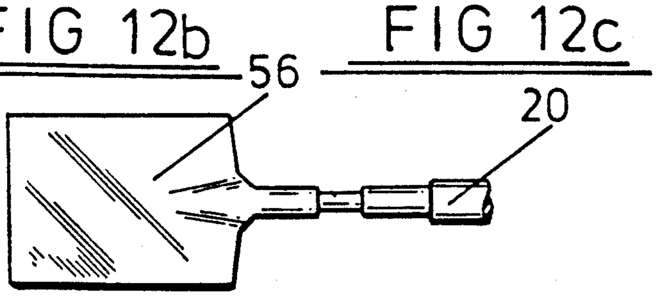
Figure 15:
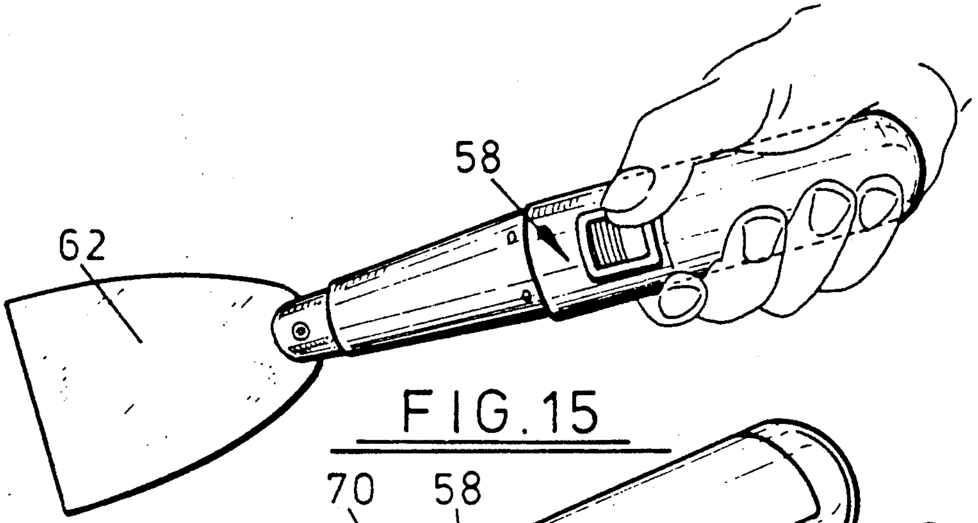
Figure 16:
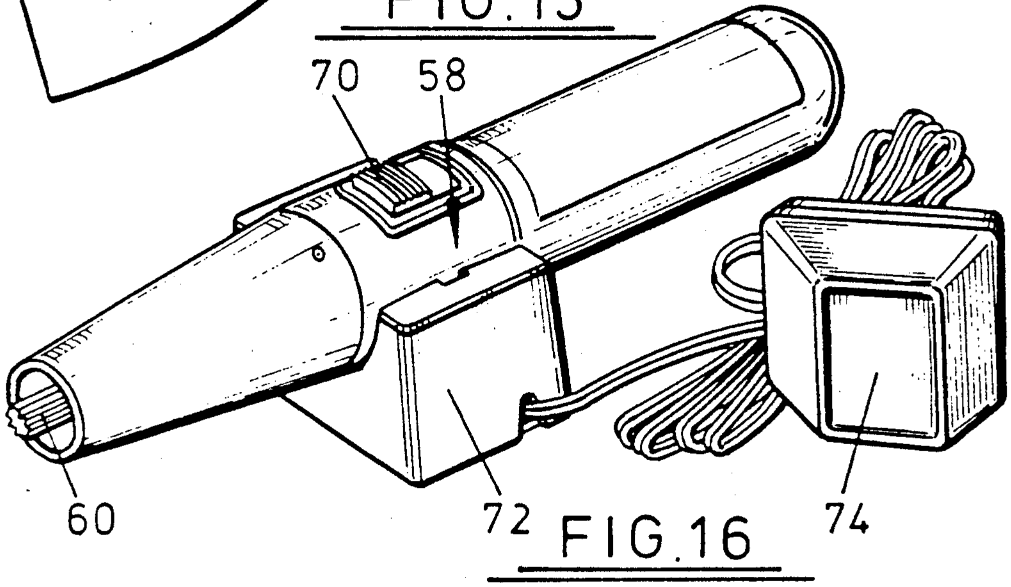
Figure 17A:
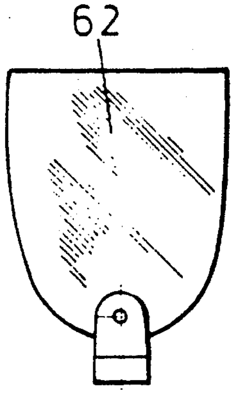
Figure 17B:
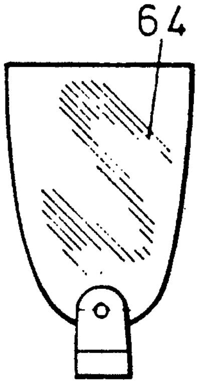
Figure 17C:
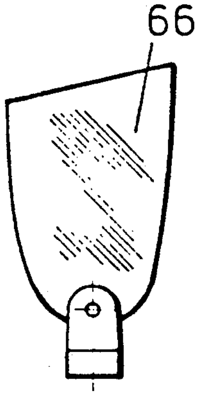
Figure 17D:
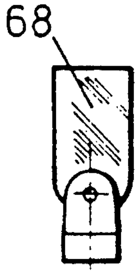

FIG. 12, a–c, shows a range of cylinder cams having various dimensions;

FIG. 13 is a sectional view on line XIII—XIII of FIG. 2;

FIG. 14 shows an alternative tool bit for use with the tool according to the invention;

FIG. 15 shows a hand-held version of a tool according to the invention;

FIG. 16 illustrates the tool of FIG. 15 in a battery recharging mode; and

Figure 18:
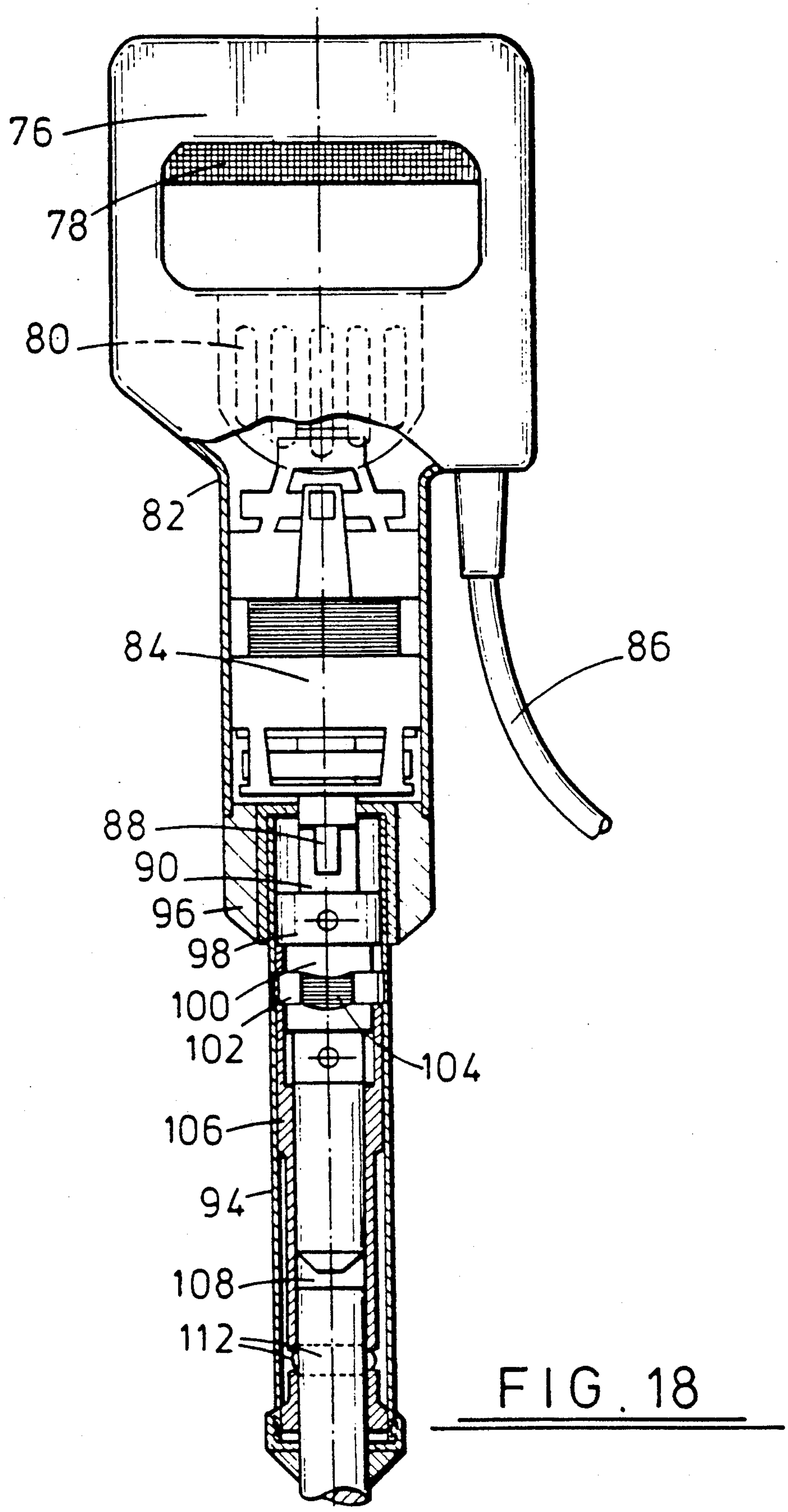
Figure 19A:
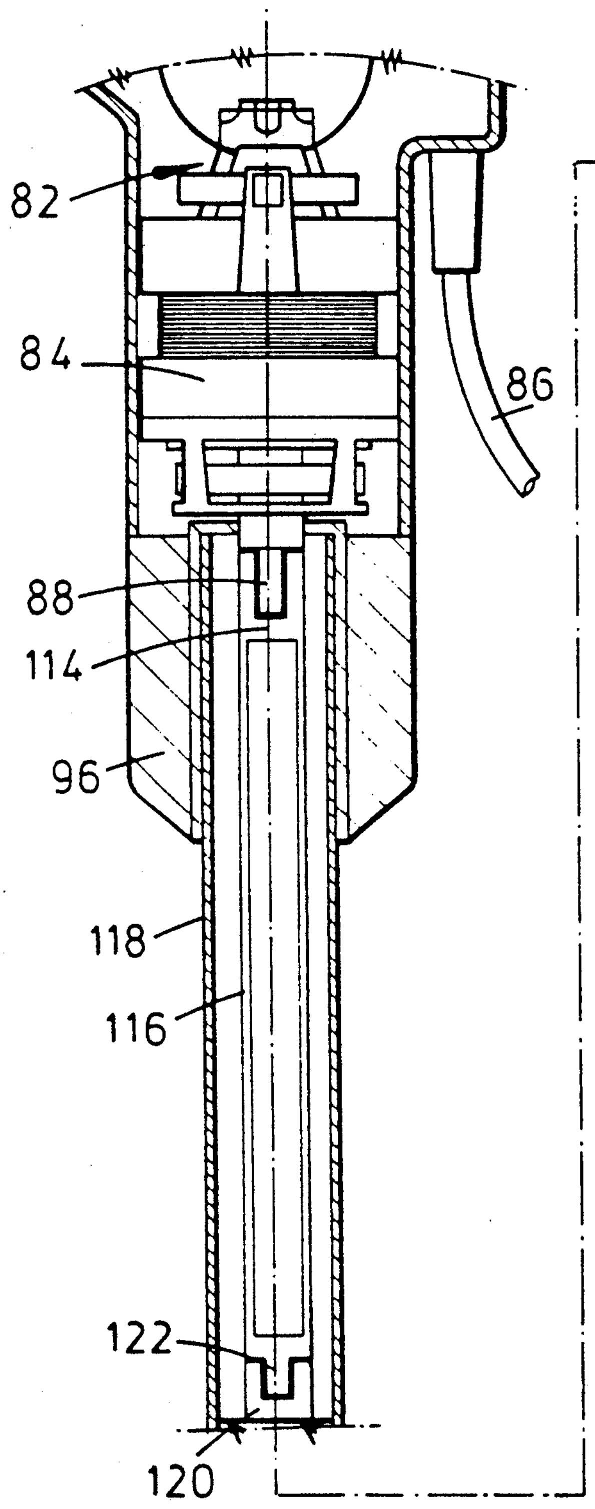
Figure 19B:
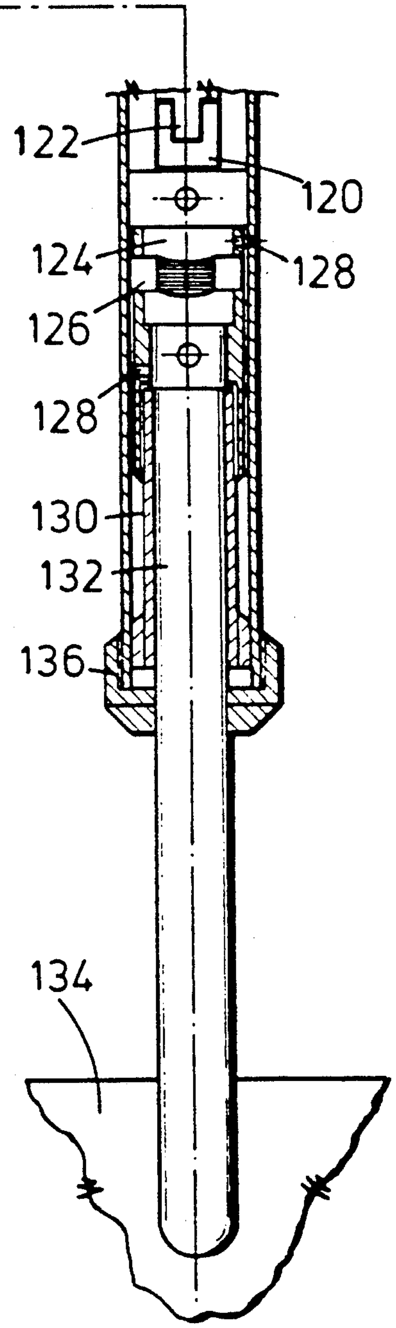

FIGS. 17 a–d show possible alternative tool bits for use with the tool of FIG. 15;

FIG. 18 is a view partly in section, of a power spade according to the invention;

FIGS. 19*a*–19*b* is a similar view of a portable cutter;

FIGS. 20 to 26 show various alternative layouts and modifications of devices according to the invention.

Figure 1:
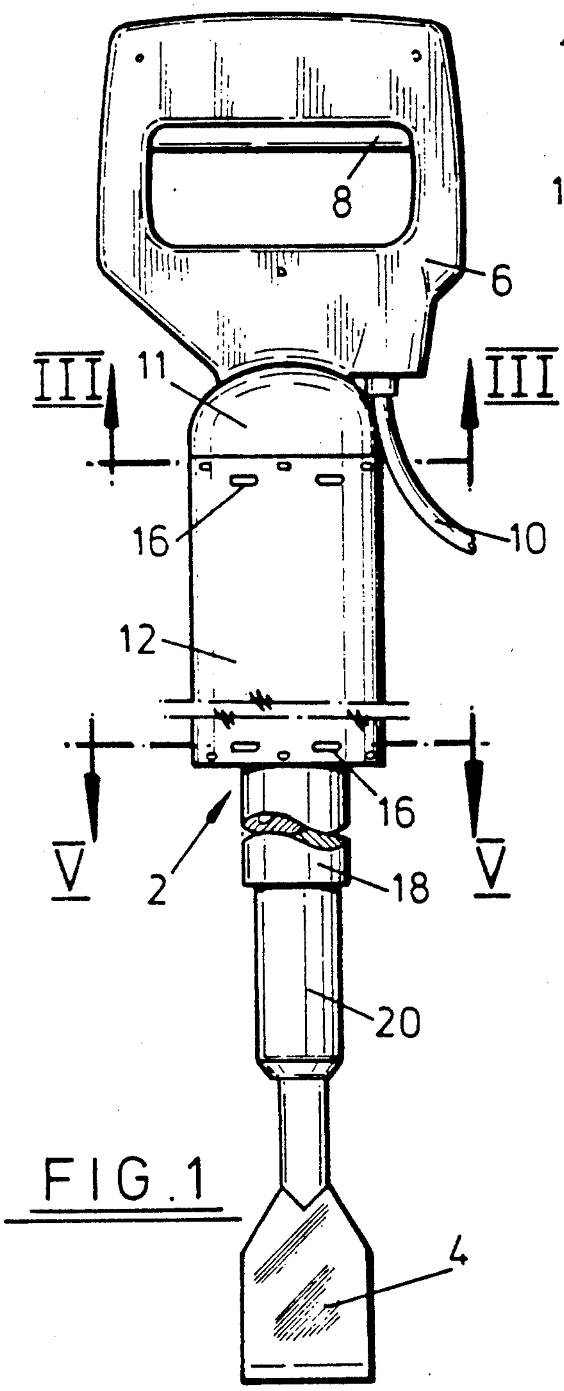
FIG. 1 is an external view of a tool according to the invention.

FIG. 1 shows a tool 2 according to the invention suitable for use with a variety of tool bits, but illustrated in the present example in use with a chisel bit 4.

The tool comprises a handle 6 incorporating a trigger grip 8 operating the power supply through a cable 10. The handle is secured to a dome-shaped end cap 11 of a housing 12 for an electric motor 14 (FIG. 2).

The housing 12 is provided with ventilation slots 16 and may be constructed in one of two sizes, long or short housing, according to the end use. A tubular casing 18 extends from the housing and from the casing projects a retaining collar 20 secured to a drive shaft to be described below, in which collar the tool bit 4 is mounted.

The construction of the device is as follows. An output shaft 22 from the motor is provided with two flats for entry into a shaped recess 24 of a subshaft 26, a collar 28 of which abuts against a thrust bearing 30 in which the subshaft 26 is mounted. The thrust bearing 30 is secured to the casing 18.

Figure 10:
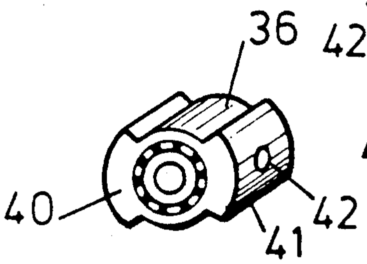
FIG. 10 is a cam thrust bearing.
Figure 11:
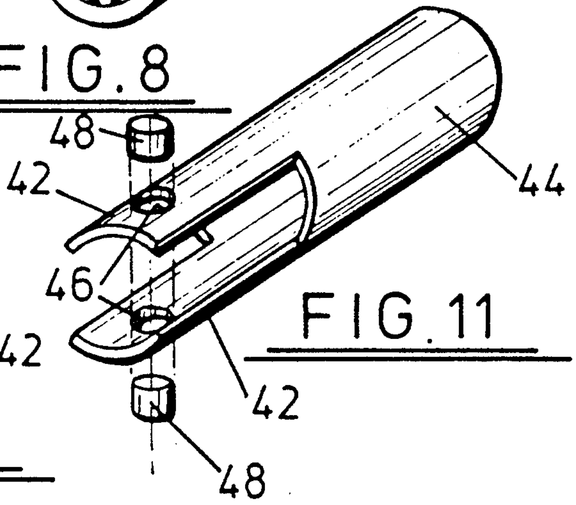
FIG. 11 is a perspective view of a hollow drive shaft of the tool.

Mounted on the subshaft 26 for rotation therewith is a cylinder cam 32 with a circumferentially arranged sinusoidal cam track 34. The lower end of the subshaft 26 is mounted in a thrust bearing 36. The bearing 36 is illustrated in FIG. 10 and it will be observed that the outer annular member thereof is formed with two opposed portions 40 of larger diameter which are secured at 41 by bolts (not shown) to the casing 18 so as to leave two arcuate gaps through which project respectively two extension portions 42 of a hollow drive shaft 44. The drive shaft is received in the casing 18 so as to permit of axial movement only.

Each extension portion 42 is provided with an aperture 46 in which is received a stud 48 adapted for rotation within the aperture and which projects inwardly from the extension portions 42 into the cam track 34 of the cylinder cam 32.

Rotation of the cam 32 by the motor therefore causes the studs 48 to move axially with respect to the centre axis of the tool, and this causes the drive shaft 44 to move axially in a reciprocating manner. The stroke of the reciprocating movement is determined by the throw of the cam track, which may be selected from, for example, the range of cams 32,32′ and 32″ shown in FIGS. 12*a–c*, i.e. 2 mm, 4 mm and 6 mm respectively.

An end piece 50 secured in the lower end of the drive shaft 44 is externally threaded to receive the bit retaining collar 20 which surrounds a tool bit, in the present example the chisel bit 4. The upper end portion of the bit 4 is step-contoured at 52 to engage with a complementary step 54 on the end piece 50.

Figure 4:
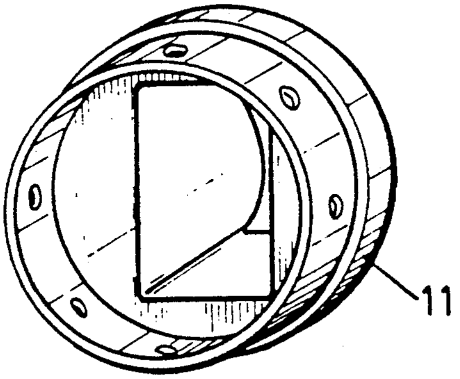
FIG. 4 is a perspective view of the motor housing end
Figure 5:
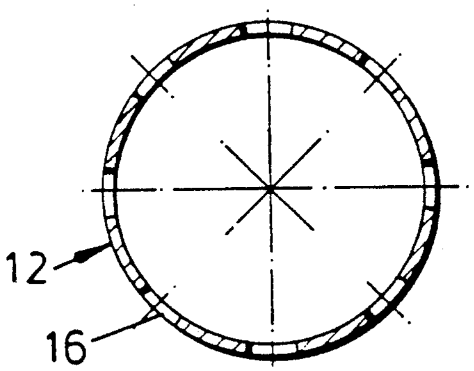
FIG. 5 is a section on line V—V of FIG. 1.
Figure 6:
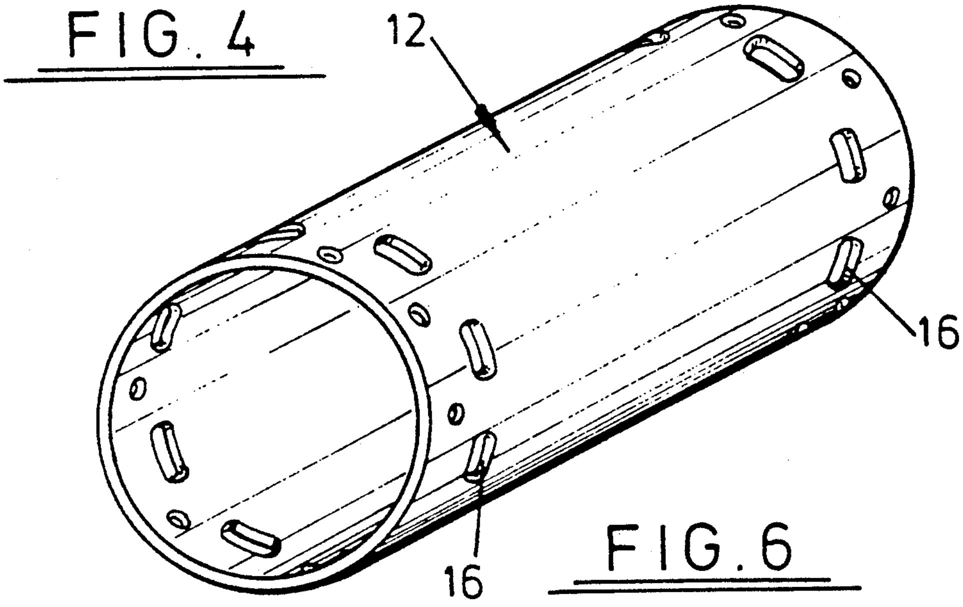
FIG. 6 is a perspective view of the motor housing.
Figure 7:
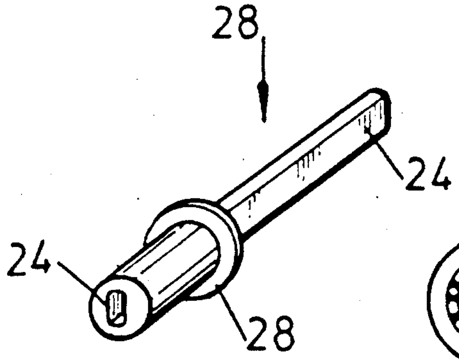
FIG. 7 is a perspective view of the motor subshaft.
Figure 8:
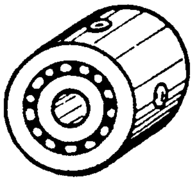
FIG. 8 is a subshaft thrust bearing.
Figure 9:
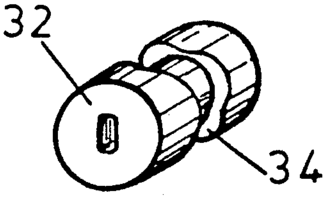
FIG. 9 is a perspective view of a cylinder cam.

It will be understood that the power tool is principally intended for small scale use, for example as a cold chisel, as a spade, as illustrated at 56 in FIG. 4, but may also be used in a smaller form as a hand-held tool, for example, for scraping or stripping paint, wallpaper or the like.

FIG. 15 illustrates an example of such a hand-held tool. While the operating mechanism of the hand-held tool differs only in scale from that already described above, the electric motor within a housing 58 is battery operated and instead of acting on the bit 4 through a hollow drive shaft, operates a splined drive shaft 60 to which may be attached a variety of tools such as 62, 64, 66 or 68 as shown in FIG. 17. The rotation of the shaft 60 is controlled through suitable reduction gearing (not shown). A finger-operated switch 70 is provided and the batteries may be recharged by positioning the device in a charging base 72 to which is connected a charge unit 74.

The device illustrated in FIG. 18 is a power cutter comprising a handle 76 with an on/off trigger switch 78. Ventilation slots 80 are provided in a motor housing 82 moulded from hard plastics material. A rotary motor 84, supplied with power via a cable 86, is selected for good torque characteristics and a suitable r.p.m. figure of at least 10,000. A motor output shaft 88 engages a socket 90 of an extension of a hollow main shaft 94 secured to a shaft support 96, and operating in an upper thrust bearing 98. A cam cylinder 100 converts the rotational motion of the motor output shaft to oscillating (reciprocating) movement by cam followers 102 engaging in a sinusoidal wave cam track 104.

A tool bit support shaft 106 is a sliding fit in the main shaft 94 and is contoured to reduce the area of friction between sliding surfaces. An end stop 108 is provided for the shaft 106. A tool bit (not shown) has a shaft 110 insertable in the support shaft 106 and retainable by a ball-and-socket arrangement 112.

FIG. 19 shows a power spade, (FIG. 19*b* is a continuation of FIG. 19*a*). Component parts similar to those of FIG. 18 are given the same reference numerals. The motor output shaft 88 is received in a socket 114 of a hollow extension shaft 116 received within a main shaft 118, comprising a rigid alloy tubular member. A further socket 120 receives the lower end 122 of the extension shaft, the socket 120 being integral with a cam cylinder 124 the rotation of which causes cam followers 126 to reciprocate as before to cause lengthwise movement of the cam follower mounting shaft 128.

The hollow shaft 128 receives a support member 130 for the shaft 132 of spade blade 134. The coaxially arranged shafts are sealed by an end cap 136.

Figure 20:
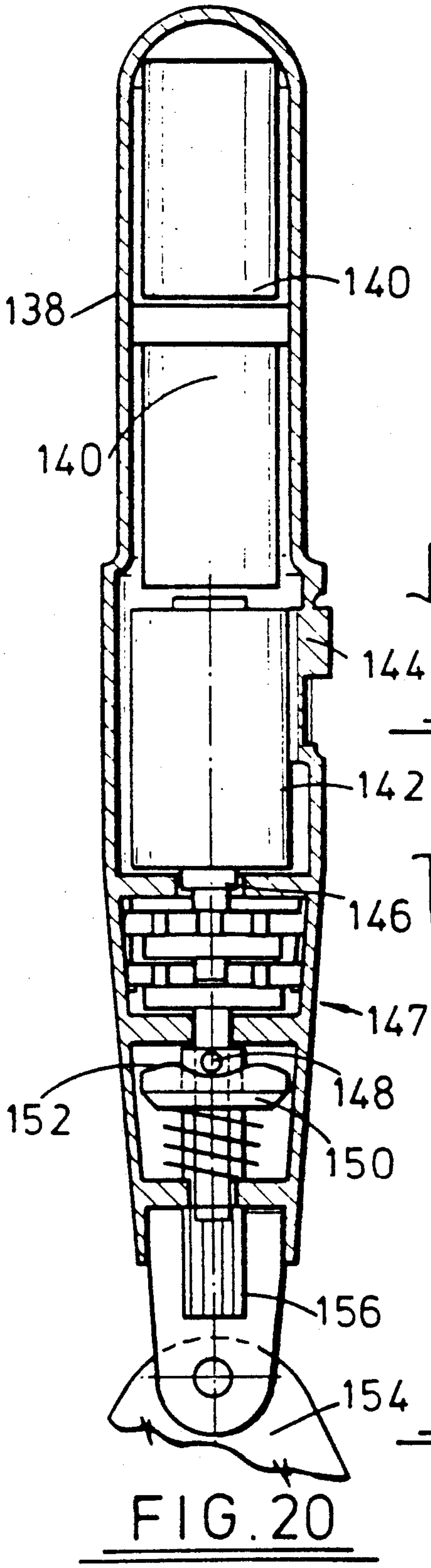

FIG. 20 shows a hand-held device suitable for use as a scraper, for example for wallpaper. A housing 138 encloses two replaceable batteries 140 which operate a motor 142 according to the position of an on/off switch 144. An output shaft 146 from the motor operates through a two-stage reduction gear device 147 to cause a cam follower arrangement 148 to rotate. A cam wheel 150, with a radially disposed cam surface 152 spring-biased towards the cam follower 148, is held captive against rotation so that it is caused to partake of reciprocating movement in an axial direction. This movement causes the desired reciprocating movement of the scraper tool blade 154 secured thereto at 156.

Figure 21:
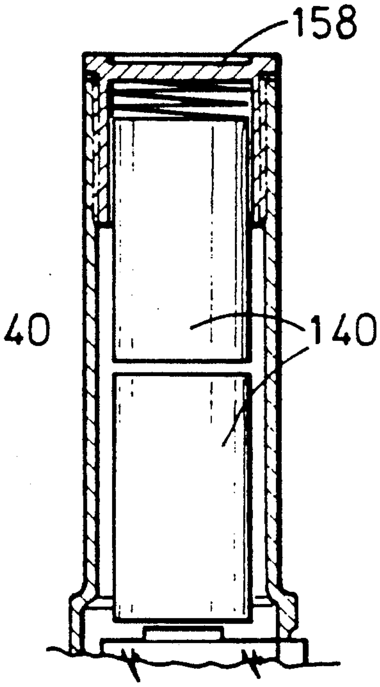
Figure 22:
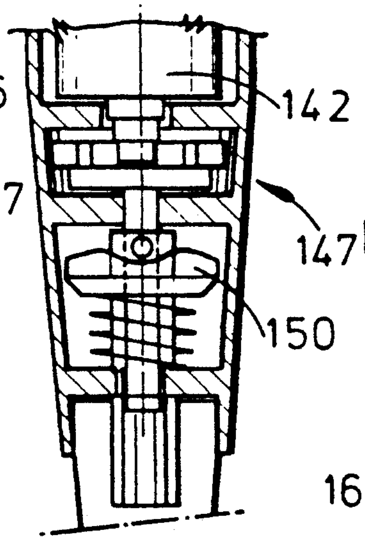

Whereas the batteries 140 of the device of FIG. 20 may be rechargeable, the batteries 140' of FIG. 21 are readily replaceable by removal of the end cap 158. FIG. 22 shows a similar device to that of FIG. 20, including a single-stage reduction gear device 147'.

Figure 23:
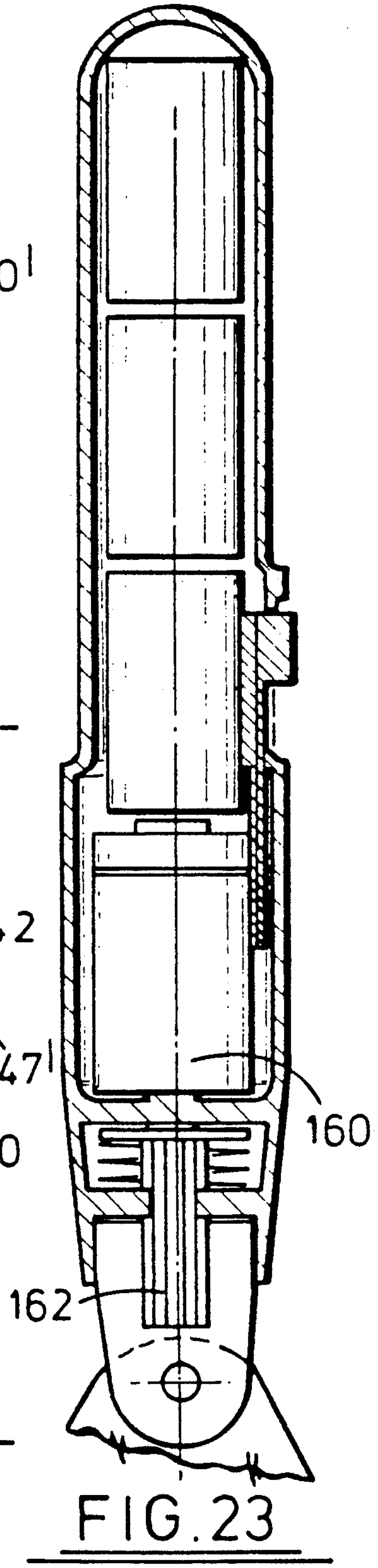

In FIG. 23, there is illustrated a modification of the scraper-tool in which the reciprocating movement is imparted by a linear output motor 160 to a spring-biased member 162 to which the scraper tool blade is securable.

Figure 24:
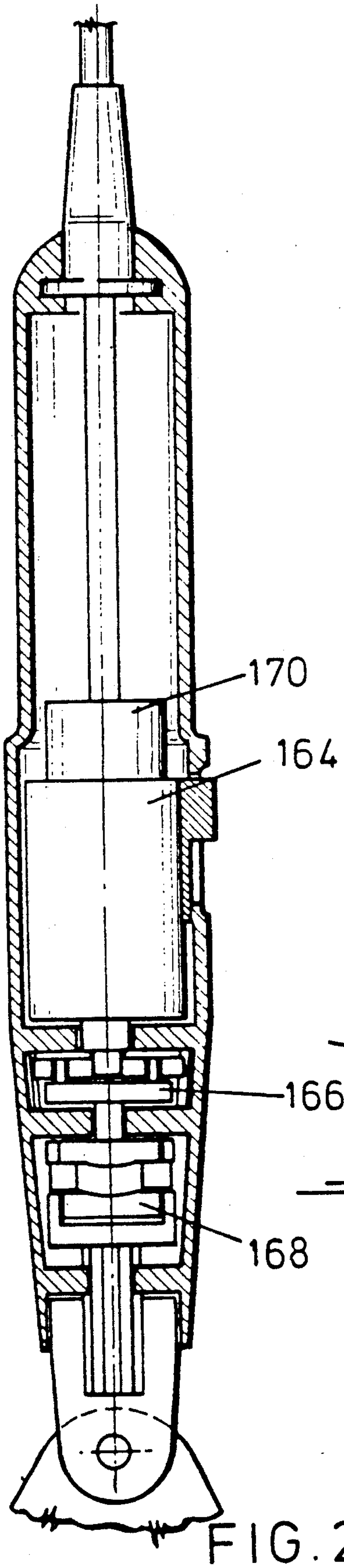
Figure 25:
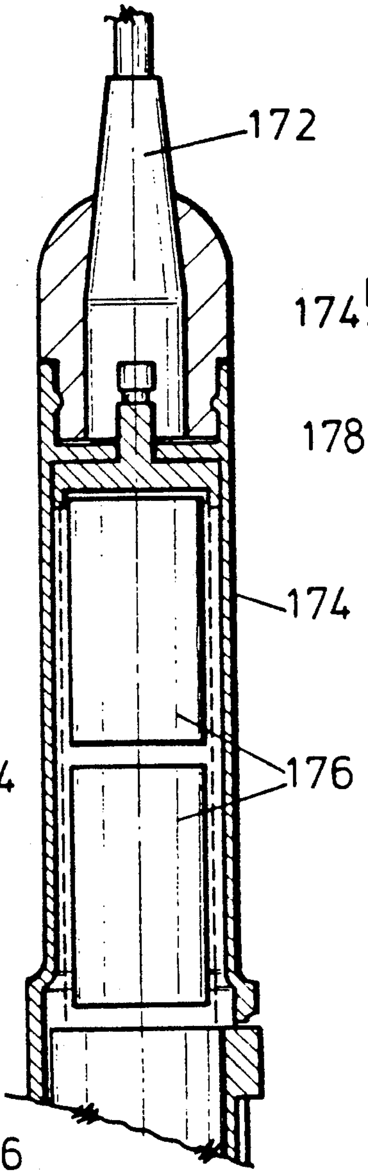

FIG. 24 shows a scraper tool in which the motor 164 is operated by mains electricity, the output of the motor illustrated being taken through a single-stage reduction gear device 166 to a cam cylinder 168. A transformer 170 is also provided.

It will be understood that it may also be considered more convenient for a linear output motor to be operated by mains electricity. However, in FIG. 25 a dual power source arrangement is shown in which a cable connector 172 may be removed from the housing 174, for example to cope with access to difficult locations, and a set of stand-by batteries 176 are then available for short-term use.

Figure 26:
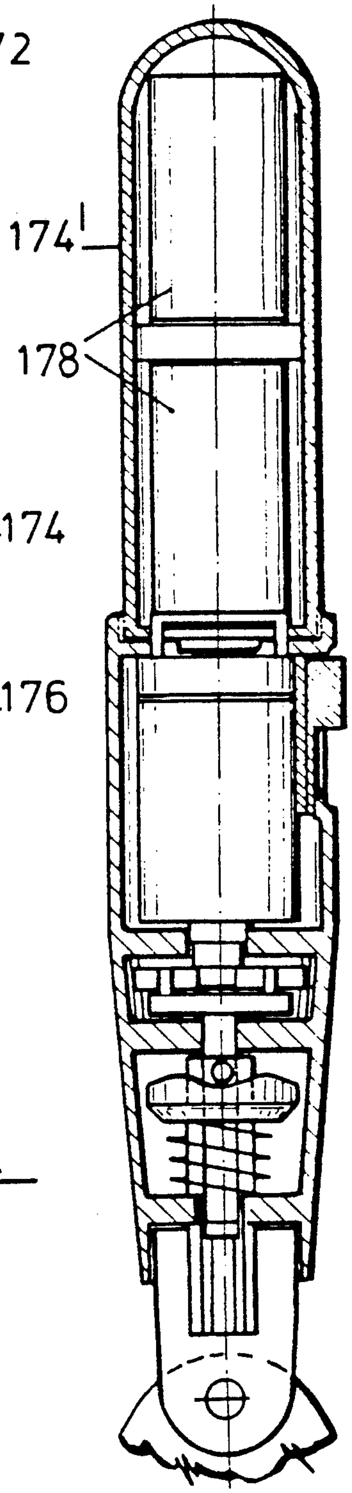

In FIG. 26, the arrangement shown incorporates a convenient form of battery replacement in which the batteries 178 and an end portion of the housing 174' are detachable as a quickly replaced module to minimise delays in completing a desired operation.

Various modifications may be made within the scope of the invention as defined in the following claims.

I claim:

1. A portable power tool powered by associated drive means and comprising a housing and a mounting arrangement for operably coupling an output shaft to an element, such as a selected one of a plurality of interchangeable tool bits, to which reciprocal axial movement is to be imparted, said housing including an output arrangement for driving said output shaft in a reciprocal axial movement to correspondingly drive said element, said output arrangement including a cylinder cam mounted for rotation with a drive shaft rotationally driven by said drive means, said cam being received within a hollow portion of said output shaft and provided with a sinusoidal cam track extending around its circumferential surface, and cam follower means in the form of a pair of struts disposed within apertures provided on said hollow drive shaft portion, said cam follower means capable of running in said cam track to impart said reciprocal motion to said output shaft.

2. A tool as claimed in claim 1, wherein the drive means is a linear motor.

3. A tool as claimed in claim 1, wherein the cylinder cam is selected from a plurality of cam members having a range of throw distances.

4. A tool as claimed in claim 1 wherein intermediate gearing may be interposed between the drive means and the output shaft.

5. A tool as claimed in claim 1 wherein the drive means is powered by main electricity using a transformer.

6. A tool as claimed in claim 1, wherein the drive means is powered by a battery.

7. A tool as claimed in claim 6, wherein there is provided a stand-by battery for occasional use.

8. A tool as claimed in claim 1, wherein the drive means includes a battery/handle module which is detachable for rapid replacement.

9. A tool as claimed in claim 1, wherein a main electricity cable is provided which is detachable from the tool, there being further provided a battery pack for use when the cable is detached.

10. A tool as claimed in claim 1 wherein the tool bit is selected from the group comprising a wallpaper scraper, a wallpaper stripper, a paint scraper, a paint stripper, a cold chisel, and other similar small hand-held tools.

11. A tool as claimed in claim 1 wherein the tool bit is selected from the group comprising a spade, an earth-breaking drill, a cutter, and a stone chipping device.

* * * * *